3,501,267
REACTION OF COAL AND AMMONIA TO
MAKE HYDROGEN CYANIDE
Glenn E. Johnson, Pittsburgh, Albert J. Forney, Coraopolis, and William A. Decker, Pittsburgh, Pa., assignors to the United States of America as represented by the Secretary of the Interior
No Drawing. Filed Mar. 13, 1968, Ser. No. 712,596
Int. Cl. C01c 3/02; C01b 1/02
U.S. Cl. 23—151    6 Claims

ABSTRACT OF THE DISCLOSURE

Hydrogen cyanide is produced by reacting ammoniated coal with ammonia at temperatures of about 1000 to 1300° C.

---

This invention, which relates to the production of hydrogen cyanide from coal, resulted from work done by the Bureau of Mines of the U.S. Department of the Interior, and the domestic title to the invention is in the Government.

Hydrogen cyanide (hydrocyanic acid) is an important industrial chemical compound used, for example, in the production of dyes, chelates, plastics and acrylonitriles. At present the raw materials utilized to commercially produce this compound are natural gas or petroleum products. Exemplary processes are the catalytic reaction of ammonia and air with methane or natural gas, and the reaction of ammonia with liquid hydrocarbons. While these hydrocarbon raw materials are comparatively reasonably priced, at present they are being rapidly depleted. Accordingly, substitution of the abundant and cheap raw material, coal, for hydrocarbons in the production of hydrogen cyanide would be highly desirable.

We have now discovered that substantial quantities of hydrogen cyanide can be produced by reacting ammoniated coal with ammonia at elevated temperatures. In comparison with reacting the ammonia with raw (unammoniated) coal, the increased yields produced by our process are completely unexpected.

It is therefore an object of the present invention to provide a process for making hydrogen cyanide from a cheap and abundant raw material. A further object is to provide a process for increasing the yield of HCN produced by reacting coal with ammonia.

Other objects and advantages will be obvious from a detailed description of the invention appearing in the following specification.

In the process of the present invention, coal, preferably in comminuted form, is enclosed in a vessel which is then pressurized (e.g., to 10–50 p.s.i.g.) with $NH_3$ so that the coal adsorbs about 0.01 pound or more of $NH_3$ per pound of coal. Thereafter, the ammoniated coal is brought into contact with ammonia gas in a heating zone wherein the coal is heated to a temperature of from about 1000° C. to about 1300° C. Heating is accomplished by any known manner such as, for example, by electrical resistance means or by a furnace. In the heating zone, the coal is maintained as a fixed, fluidized or moving bed, or it can be passed in a dispersed manner therethrough. Rapid heating of the coal can be accomplished by allowing the coal particles to fall substantially freely through the zone.

HCN-containing gases are produced by the ammoniated coal-ammonia reaction, and can be removed from the heating zone by means of a pump or an inert carrier gas. Likewise, unreacted ammonia gas or unreacted ammonia decomposition products (hydrogen and nitrogen) or unreacted gases released by the coal can serve as carrier gas. The main purpose of an externally supplied carrier gas is to move the coal more rapidly through the reactor so as to prevent the char and solid particles from sticking to the reactor surfaces which could cause plugging in a small unit. Unreacted gases present during the reaction are sufficient to prevent plugging in large units.

Removed product gases of the reaction are then treated with a conventional commercial process to remove the HCN. For example, the product gas can be washed with dilute $H_2SO_4$ to remove unreacted $NH_3$, then washed with water to adsorb the HCN.

Since hot HCN is decomposed upon contact with many metal substances, those parts of the equipment with which the hot HCN comes into contact should be constructed of non-metals (e.g. ceramics).

The following example illustrates a specific way in which the process of the present invention has been carried out:

1593 grams of minus 300 mesh bituminous coal were placed in a vessel, and the vessel pressurized with commercial-grade $NH_3$ at 10 p.s.i.g. for a period of time to enable 41 grams of $NH_3$ to be adsorbed thereon. Ammoniated coal was then charged to a hopper above a vertical ceramic reactor tube, and maintained in the hopper under an ammonia atmosphere. The coal was then fed downwardly through the reactor tube at a rate of 180 grams per hour (equivalent to a rate of about 50 pounds of coal per hour per square feet of cross-sectional tube area), while the tube was maintained at a temperature of 1250° C. by means of electrical resistance heaters. Ammonia was fed to the reactor tube at a rate of 1.0 ft.$^3$/hr.

Helium was used as a carrier gas. Product gases were washed first with dilute $H_2SO_4$, then water-washed to form an HCN solution.

To compare the reaction of ammonia with ammoniated and unammoniated coal, a plurality of different coals, in unammoniated and ammoniated form, were fed downwardly, concurrently with helium, through the reactor tube described in the preceding example. The tube was maintained at a temperature of 1250° C. Table I shows the results of these tests.

TABLE I

|  | Cannel coal | | Anthracite coal | | Bituminous (h.v.a.) coal | |
|---|---|---|---|---|---|---|
|  | Unammoniated | Ammoniated | Unammoniated | Ammoniated | Unammoniated | Ammoniated |
| Coal feed, g./hr | 115 | 115 | 170–180 | 170–180 | 175 | 180 |
| $NH_3$ employed for adsorption, ft.$^3$/hr.[1] |  | .17 |  | .30 |  | .30 |
| $NH_3$ gas flow to reactor, ft.$^3$/hr | 1.00 | .83 | 1.10 | .80 | 1.15 | .80 |
| Total $NH_3$ employed, ft.$^3$/hr | 1.00 | 1.00 | 1.10 | 1.10 | 1.15 | 1.10 |
| Helium carrier gas, ft.$^3$/hr | 2.07 | 2.04 | 1.02 | 1.05 | 1.01 |  |
| Percent HCN in product gas [2] | 9.5 | 10.9 | .1 | .6 | 8.8 | 10.9 |
| HCN, ft.$^3$/lb. coal | 1.24 | 1.72 | .007 | .048 | 1.30 | 1.56 |
| HCN, ft.$^3$/ft.$^3$, total $NH_3$ feed | .32 | .44 | .004 | .017 | .43 | .57 |

[1] Adsorbed on coal by pressurizing coal-containing vessel to 50 p.s.i.g. with ammonia gas. As pressure inside of the vessel dropped off (due to adsorption of ammonia on coal surface), vessel was repressurized to 50 p.s.i.g. This procedure was repeated until pressure inside the vessel remained constant, indicating no further adsorption of ammonia. Before the coal was transferred to the feeder-hopper of the reactor tube, the ammonia pressure was reduced to atmospheric. During adsorption, the cannel coal adsorbed an amount of ammonia equal to 3.2 percent of the coal's weight, while the anthracite and bituminous coals each adsorbed ammonia equal to 3.6 percent of their weight.

[2] Wet analytical method of analysis, carrier gas-free basis.

As can be seen from the Table I, when the coal is ammoniated, a marked increase in the amount of HCN produced per total amount of $NH_3$ employed occurs. This increase ranges from over 32% for bituminous coal to over 300% for anthracite coal.

Considering the fact that coal presently costs ¼ cent per pound compared to 1 cent to 1½ cents per pound for the hydrocarbon raw materials presently used to produce HCN, the process of the present invention offers a new, economical way to produce this valuable chemical.

While the particular process herein described is well adapted to carry out the objects of the present invention, it is to be understood that various modifications and changes may be made all coming within the scope of the following claims.

What is claimed is:
1. A process for producing HCN from coal and ammonia comprising
    (a) ammoniating said coal under pressure until at least about 0.01 pound of ammonia per pound of coal is adsorbed; and
    (b) reacting said ammoniated coal with ammonia gas at a temperature of from about 1000° C. to about 1300° C. to form HCN-containing product gas.
2. The process of claim 1 further comprising separating HCN from said product gas.
3. The process of claim 1 wherein said coal is bituminous coal.
4. The process of claim 1 wherein said reaction step comprises passing dispersed, particulate ammoniated coal through a heating zone containing said ammonia gas.
5. The process of claim 4 wherein said particulate coal is minus 300 mesh and said heating zone temperature is about 1250° C.
6. The process of claim 4 further comprising injecting an inert gas into said heating zone to carry out said product gas.

References Cited
UNITED STATES PATENTS 2,671,015   3/1954   Morley _____ 23—210

FOREIGN PATENTS 854,268   11/1960   Great Britain.

OSCAR R. VERTIZ, Primary Examiner

HOKE S. MILLER, Assistant Examiner

U.S. Cl. X.R.

23—210